(12) United States Patent
Park et al.

(10) Patent No.: US 7,603,628 B2
(45) Date of Patent: Oct. 13, 2009

(54) USER INTERFACE FOR AND METHOD OF MANAGING ICONS ON GROUP-BY-GROUP BASIS USING SKIN IMAGE

(75) Inventors: Sang-shin Park, Seoul (KR); Soo-hyeon Koh, Seongnam-si (KR); Hee-jeong Kim, Seoul (KR); Ji-hyun Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 11/281,592

(22) Filed: Nov. 18, 2005

(65) Prior Publication Data

US 2006/0112354 A1 May 25, 2006

(30) Foreign Application Priority Data

Nov. 19, 2004 (KR) ............... 10-2004-0095246

(51) Int. Cl.
*G06F 3/048* (2006.01)
*G06F 3/00* (2006.01)

(52) U.S. Cl. ............ 715/764; 715/744; 715/747; 715/810; 715/835

(58) Field of Classification Search ............ 715/744, 715/745, 747, 764, 775, 810, 835, 802
See application file for complete search history.

(56) References Cited

U.S. PATENT DOCUMENTS

| 5,708,786 | A | * | 1/1998 | Teruuchi | 715/788 |
| 5,721,853 | A | | 2/1998 | Smith | 395/353 |
| 5,784,061 | A | * | 7/1998 | Moran et al. | 715/863 |
| 5,838,317 | A | * | 11/1998 | Bolnick et al. | 715/764 |
| 5,959,624 | A | | 9/1999 | Johnston, Jr. et al. | 345/334 |
| 6,020,888 | A | * | 2/2000 | Ho | 715/835 |
| 6,469,722 | B1 | | 10/2002 | Kinoe et al. | 345/837 |
| 2003/0011639 | A1 | * | 1/2003 | Webb | 345/808 |
| 2004/0017376 | A1 | * | 1/2004 | Tagliabue et al. | 345/581 |
| 2005/0010873 | A1 | * | 1/2005 | Nakamura | 715/744 |
| 2005/0125736 | A1 | * | 6/2005 | Ferri et al. | 715/747 |

FOREIGN PATENT DOCUMENTS

JP 2001-351127 12/2001

* cited by examiner

*Primary Examiner*—Tadese Hailu
*Assistant Examiner*—Nicholas S Ulrich
(74) *Attorney, Agent, or Firm*—Staas & Halsey LLP

(57) ABSTRACT

A user interface for and method of managing icons on a group-by-group basis using a skin image. The user interface includes an icon room which selectively provides a skin image or a reduced skin image on a desktop background depending on whether the skin image or the reduced skin image is activated, and a plurality of icon images which are included in the icon room and are provided on the skin image when the icon room is activated.

20 Claims, 11 Drawing Sheets

USER INTERFACE FOR AND METHOD OF MANAGING ICONS ON GROUP-BY-GROUP BASIS USING SKIN IMAGE

CROSS-REFERENCE TO RELATED APPLICATION

This application claims priority from Korean Patent Application No. 10-2004-0095246 filed on Nov. 19, 2004 in the Korean Intellectual Property Office, the disclosure of which is incorporated herein by reference.

BACKGROUND OF THE INVENTION

1. Field of the Invention

The present invention relates to a user interface and method for managing icons on a group-by-group basis using a skin image.

2. Description of Related Art

In the past, typical data input/output means in a computer system was a keyboard. However, with the advent of a user interface based on a graphic user interface (GUI) to increase usability, users require not only a keyboard but also a mouse to work on a computer.

GUIs have become the preferred method through which users have chosen to interact with their computers, necessitating computer mice in addition to keyboards.

Computer systems have become operated with mouse clicking rather than with traditional keyboard input based on user's text command performed by clicking elements called icons.

Current GUIs, such as those in the MICROSOFT WINDOWS® line of products, display a number of icons on desktop backgrounds, often referred to as "windows," thus facilitating usability. In a Linux or Unix system, in order to provide user inputs, icons are used by X Windows environment based on a Motif interface. In addition, Macintosh or IMac line of products manufactured by the Apple Computer, Inc., implement or display user's desired functions or contents by icon clicking.

Icons contribute to user's convenience from the viewpoint of effective accessibility to computer system functions. In particular, an icon contains an image; it allows a user to easily know which function is associated with it.

Figure 1A:
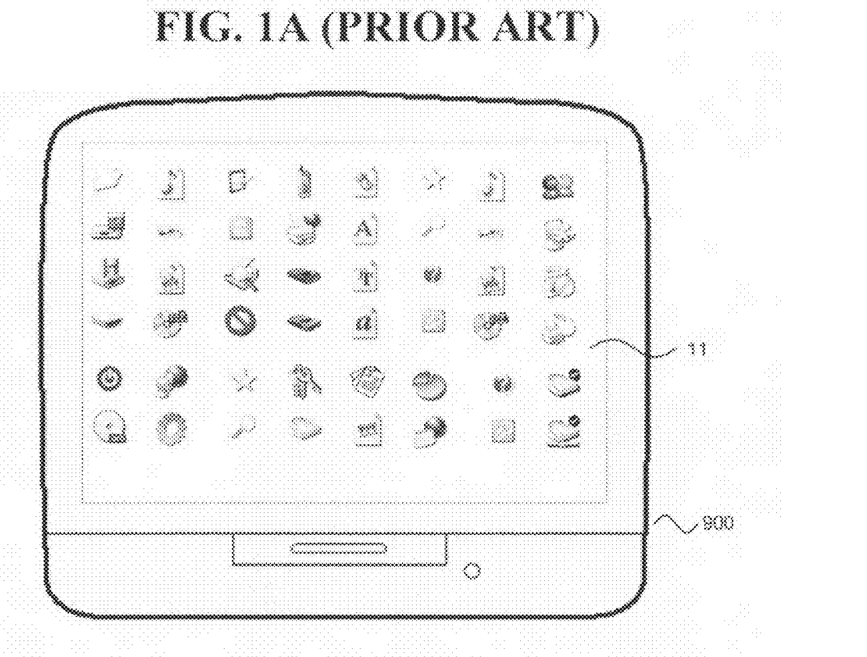
FIGS. 1A and 1B illustrate conventional arrangements of icons on a screen.
Figure 1B:
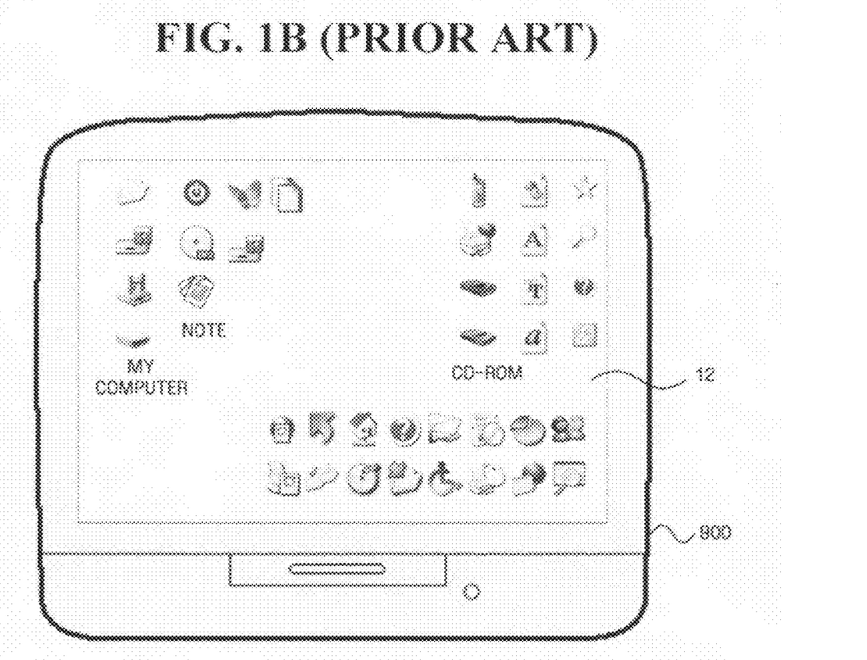

FIGS. 1A and 1B illustrate conventional arrangements of icons on a screen.

A reference numeral 900 indicates an output device of a computer such as a monitor and a reference numeral 11 indicates a screen.

The icons are arranged on the screen 11 in a two-dimensional manner. The arrangement shown in FIG. 1 is a common pattern, and functions and characteristics of the icons are not taken into consideration.

The icons may be arranged according to, for example, the order in which they are created, their format, or by name. However, the icons are not arranged in such a manner as desired by a user.

Conventionally, a user classifies and arranges desired icons as shown in a screen 12. By moving an icon to a predetermined portion of the screen 12, icons can be visually classified. However, when a new icon is added or classified icons are re-arranged, every single icon should be inconveniently moved.

Size of icons that can be arranged on a screen is limited. Thus, in a conventional system that arranges icons on a single screen at a time, an increasing number of icons cannot be properly arranged. As a result, icons cover a screen, leading to a reduced usability.

Thus, there is a need for a method and user interface for managing an increasing number of icons, in which usability is taken into account.

BRIEF SUMMARY

An aspect of the present invention improves usability by efficiently managing icons.

An aspect of the present invention also improves usability by arranging icons on a desktop background using a skin image.

According to an aspect of the present invention, there is provided a user interface for managing icons on a group-by-group basis using a skin image. The user interface includes an icon room which selectively provides a skin image or reduced skin image on a desktop background when the skin image or reduced skin image is activated. The icon room also provides a plurality of icon images included in the icon room on the skin image when the icon room is activated.

According to another aspect of the present invention, there is provided a method for managing icons on a group-by-group basis using a skin image, the method including selectively providing a skin image or a reduced skin image of an icon room on a desktop background according to whether the icon room is activated, receiving an input signal activating the icon room, and providing a plurality of icon images included in the icon room on the provided skin image.

According to another aspect of the present invention, there is provided a user interface comprising: an icon room selectively providing a skin image or a reduced skin image on a desktop background depending on whether the skin image or the reduced skin image is activated; and at least one icon image disposed in the icon room and provided on the skin image when the icon room is activated.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Terms used herein are defined as follows.

Icon

An icon means a small image representing an application, a capability, or some other concept or specific entity with meaning for a user. An icon is usually selectable but can also be a non-selectable image such as a company's logo.

On a Web page, an icon is usually a graphic image representing the topic or information category of another Web page. Frequently, the icon is a hypertext link to that page. Typically, icons are gathered in one or two places on a page, either as separate graphic files or as a single image map. Icons can be combined with characters that inform users of information and functions provided by a relevant icon. In a digital device, an icon is linked to an execution file that executes a specific function or a document or music file. Thus, when the icon is double-clicked, selected, or executed through an input such as a click, the execution file linked to the icon is executed or the document file linked to the icon is opened. Users usually click or select images representing icons.

Pointing device

A pointing device means an input device such as a mouse, a tablet pen, or a touch screen that is used to move upwards, downwards, to the left or to the right, and to point to a specific position.

Desktop Background

A desktop background means a screen in which command windows of different OS programs are displayed. Since most of currently commercially available operating systems support multi-windows, icons are arranged on the desktop background on which multiple windows may appear or disappear.

Figure 2:
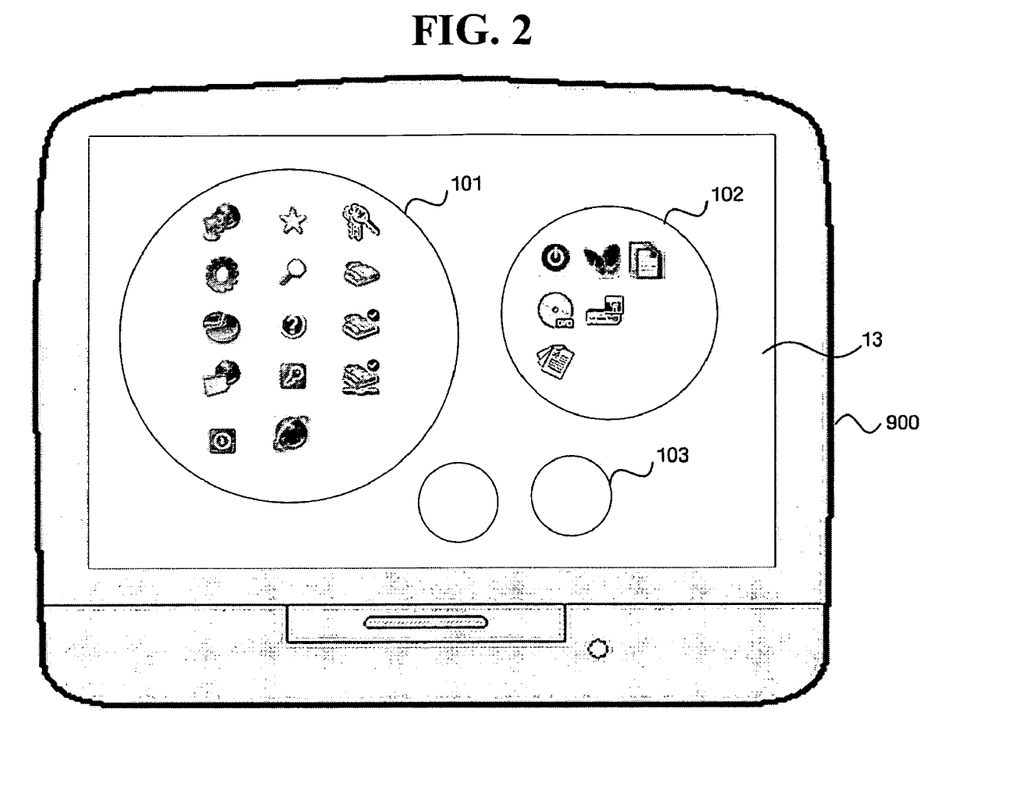
FIG. 2 illustrates icon rooms according to an embodiment of the present invention, which are output on a desktop background.

FIG. 2 illustrates icon rooms according to an embodiment of the present invention, which are output on a desktop background. As can be seen from a screen 13, icons are arranged as groups in bubble images. Groups such as bubbles including icons are referred to as icon rooms.

Icon rooms 101, 102, and 103 are used to distinguish icons of a specific group from other icons. The icons are comprised of images or images and text. In addition, the icon rooms 101, 102, and 103 allow users to manage and independently arrange icons belonging to relevant icon rooms and can include images to be output on a desktop background. Such images, which are called skin images, can take various forms, such as bubbles and spread forms, and are not limited to conventional squares.

The size and position of an icon room can be changed. The size and position of an icon room can be visually recognized through the size and position of a skin image of the icon room. Like an icon room 103, when an icon room is minimized or deactivated, it occupies the smallest area of the desktop background. An activated icon room 101 or 102 is deactivated when the focus of a pointing device is lost from the activated icon room 101 or 102 or a user performs an action such as pressing a deactivating/minimizing button. The deactivated icon room 103 uses a reduced skin image. The reduced skin image may be a reduced image of a skin image. Alternatively, the reduced skin image can take a form that is different from a skin image, but instead may provide users with information indicating that the skin image is reduced or minimized. The deactivated icon room 103 may be activated or maximized through an operation of the pointing device such as a mouse click or mouse movement such that images of icons in the icon room 103 are shown to allows users to select or execute an icon.

Figure 3:
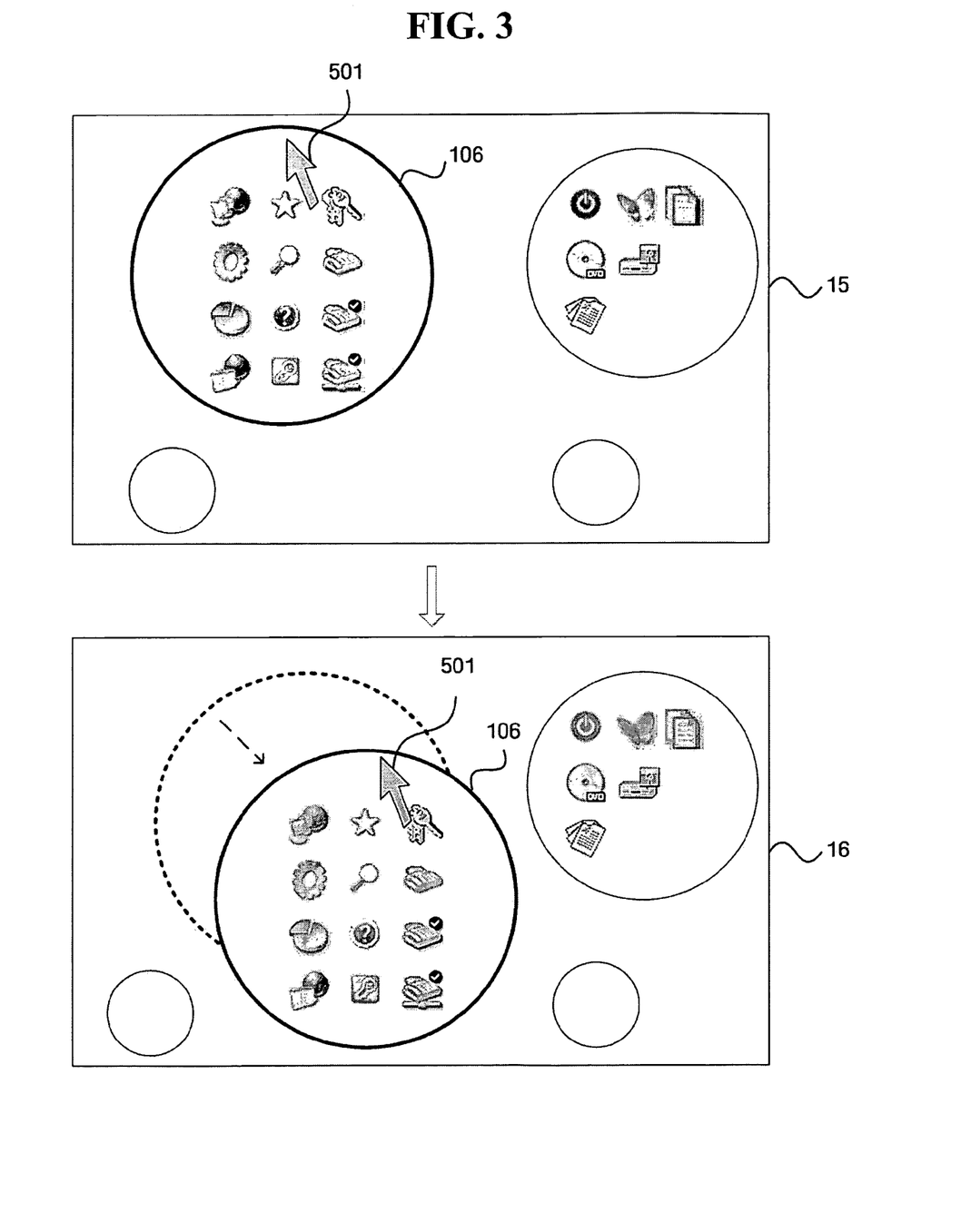
FIG. 3 illustrates movement of an icon room according to an embodiment of the present invention.

FIG. 3 illustrates movement of an icon room according to an embodiment of the present invention. In FIG. 3, the output device 900 such as a monitor shown in FIGS. 1 and 2 is not shown for convenience of explanation. Reference numerals 15 and 16 indicate desktop backgrounds displayed through the output device. Upon movement of an icon room, a skin image of the icon room, which visually shows the icon room, also moves. The size and position of a skin image of an icon room can be changed. A skin image of an icon room can be moved using a pointing device such as a mouse, a tablet pen, a touch screen or a keyboard. When a skin image is moved using a keyboard, hot keys can be set as direction keys for moving the skin image. An icon room 106 is selected using a mouse pointer 501 in the desktop background 15 and dragged down in the desktop background 16.

As a skin image of an icon room is moved, an image of a desktop background, which is overlapped by the skin image, is restored. When a topmost skin image is moved, a skin image immediately under the topmost skin image is restored.

Figure 4:
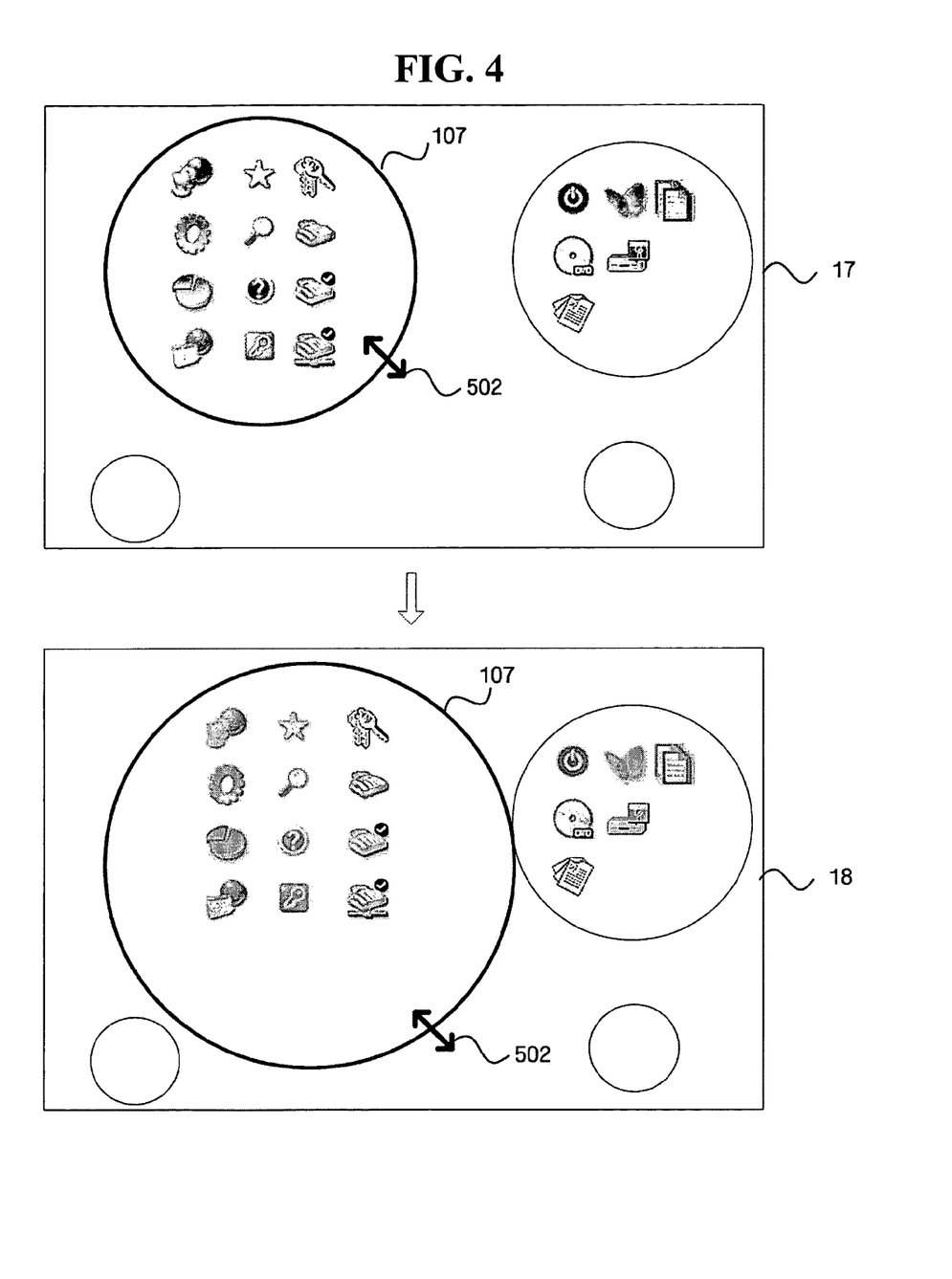
FIG. 4 illustrates adjustment of the size of an icon room according to an embodiment of the present invention.

FIG. 4 illustrates adjustment of the size of an icon room according to an embodiment of the present invention. The size of an icon room can be adjusted using a pointing device such as a mouse, a tablet pen, or a touch screen. A mouse pointer 502 is pointed to a boundary of an icon room 107 in a desktop background 17, i.e., a boundary of a skin image of the icon room 107, to adjust the size of the icon room 107. Thus, the size of the icon room 107 can be adjusted as shown in a desktop background 18. As the mouse pointer 502 approaches the boundary of the skin image, the pointer is changed into an arrow as shown in FIG. 4 to inform users that size adjustment is available. Upon size adjustment, an area occupied by the icon room 107, i.e., an area occupied by the skin image of the icon room 107, is enlarged or reduced and a skin image of another icon room or an image of a desktop background may be overlapped by the enlarged skin image or restored.

Figure 5:
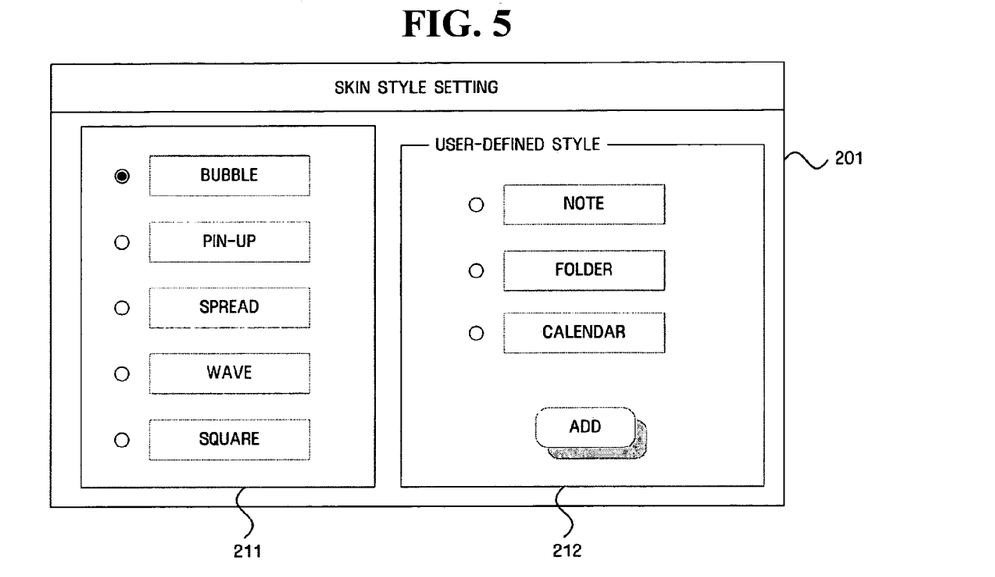
FIG. 5 illustrates a menu for selecting a skin image style of an icon room according to an embodiment of the present invention.

FIG. 5 illustrates a menu for selecting a skin image style of an icon room according to an embodiment of the present invention. An icon room is an area including icons and uses a specific image to indicate the area. A menu 201 allows users to select a skin image style of an icon room.

A default skin style menu 211 includes default skin image styles. The skin image style of the icon rooms shown in FIGS. 2, 3, and 4 is a bubble style, and the icons are arranged in bubbles. A pin-up style image is a skin image that appears as a pinned-up piece of paper, and icons are arranged in the pinned-up paper. A spread style is a skin image style that is shown as if a piece of paper is spread out. A wave style is a skin image style in which a desktop background is divided into different, and icons are arranged in each of the waves. A square style is a skin image style that is shown as a square, and icons are arranged in the square.

An icon room can be created by a user. Thus, a user can add a skin image style in a user-defined style menu 212. Since an icon room can be created using an image file, a user can register and use a user-defined style. An image file used as a skin image exists independently of the resolution of an output device. Thus, an icon room can be represented using an image file that is independent of the resolution of the output device. In other words, when a user adjusts the size of a skin image using a pointing device, since only an image used as the skin image is size-adjusted and exists independently of the resolution of the output device, the user can store the skin image as a file regardless of a resolution supported by one skin image style. Thus, when a user installs a user interface, it is possible to prevent a slow-down of a processing speed of a system caused by a plurality of files and reduce a load of the system.

It is to be understood that the skin image styles shown in FIG. 5 are only examples and can be expanded by adding skin image styles or images.

Figure 6:
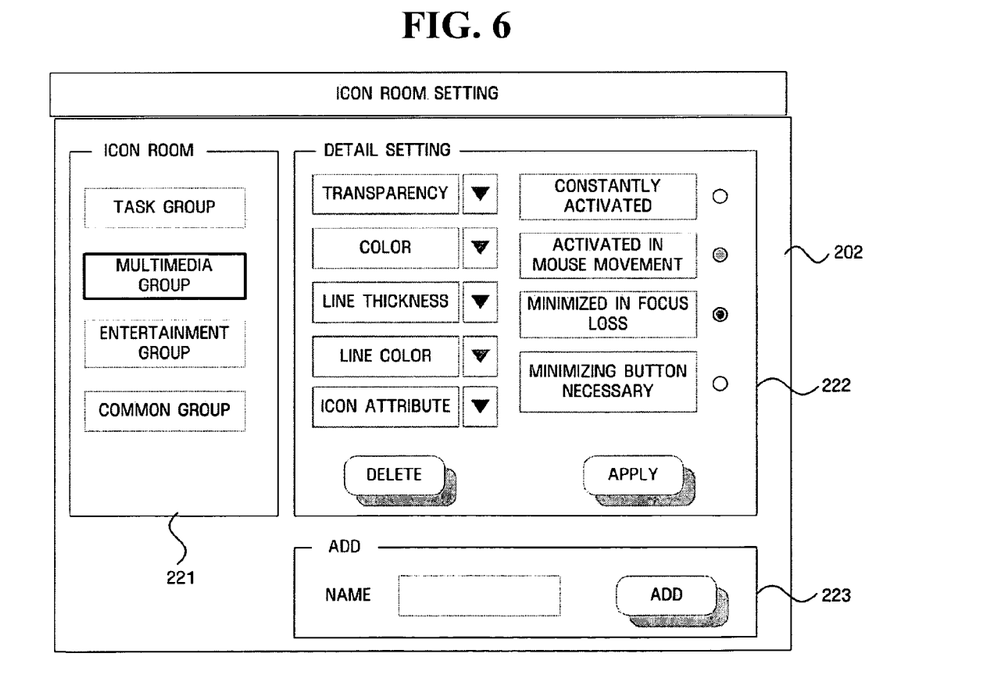
FIG. 6 illustrates a menu for defining features of an icon room according to an embodiment of the present invention.

FIG. 6 illustrates a menu for defining features of an icon room according to an embodiment of the present invention. An icon room is used to group icons and manage the icons on a group-by-group basis. A selected one of the skin image styles shown in FIG. 5 is applied to all the icon rooms on a desktop background. In FIG. 6, functions of setting and managing features of each icon room, adding a new icon room, and deleting an already existing icon room are provided.

In FIG. 6, four currently set icon rooms are shown in an icon room menu 221. Features of the four icon rooms can be set by a user through items of a detail setting menu 222. In addition, any of the four icon rooms can be deleted. However, deletion of a common group icon room may be blocked. When a user desires to delete a specific icon room and keep icons included in the specific icon room or when it is not determined which icon room will include a created icon, the user may use the common group icon room. Thus, careless deletion by a user may be prevented by blocking deletion of the common group icon room.

The features of an icon room, which can be set through the detail setting menu 222, are as follows. Transparency indicates the transparency of an image that is set as a skin image style of an icon room. As an image becomes more transparent, a picture of a desktop background or a skin image of another icon room may appear through the image. A color indicates the color of an icon room. A line thickness and a line color indicate the thickness and color of a line indicating a boundary of an icon room. An icon attribute indicates that when a created icon has an attribute that is set in this icon, it is automatically included in a relevant icon room. For example, in FIG. 6, features of a multimedia group icon room are set. Here, if the icon attribute is set as "Multimedia" and an icon related to a multimedia file is created, the created icon is automatically included in the multimedia group icon room.

Icon attributes include, for example, "execution program", "multimedia content", and "document". In addition, the icon attribute can indicate an attribute of an object linked to an icon. An icon is a visual area having an image with text added thereto and is linked to a specific document or program to execute the document or program.

Only one of a "Constantly activated" item and an "Activated in mouse movement" item can be selected at a time. If the "Constantly activated" item is selected, an icon room is constantly activated unless it is minimized using a mouse. If the icon room is activated, icons included in the icon room are shown, like the icon rooms 101 and 102 of FIG. 2. The icon room 103 of FIG. 2 is deactivated or minimized. A "Minimized in focus loss" item or a "Minimizing button necessary" item allows a user to select whether to automatically minimize a relevant icon room or minimize the relevant icon room by pressing a minimizing button when the focus of a mouse is lost from the relevant icon room.

A delete button is used to delete a selected icon room. In FIG. 6, if the delete button is pressed when the multimedia group icon room is selected, the multimedia group icon room is deleted. Icons included in the multimedia group icon room may be moved to the common group icon room or deleted.

An apply button is used to apply set features of the detail setting menu 222 to a selected icon room (the multimedia group icon room in FIG. 6). An addition menu 223 is used to add a new icon room. A user can input a name of the new icon room and add the new icon room through the addition menu 223. A name of an icon room may be previously set by a system such as a common group 1 or a common group 2.

Some of the items shown in FIG. 6 may not be set according to a skin image style of an icon room. When a skin image of an icon room is a wave style, it is preferable that the icon room is deactivated when the focus of a pointing device is lost from the icon room. This is because when all the icon rooms on a desktop background are activated, they may exceed the size of a screen.

A group name of the icon room menu 221 of FIG. 6 can be initially set by a user and several groups can be previously set at the time of providing a system. This is because the function of an icon can be related to execution of a program, reproduction of multimedia content, a system environment setting, or a user-stored document. Thus, if a user initially applies a user interface according to an embodiment of the present invention or has not yet set an icon room, an icon can be automatically assigned to a default group icon room according to its function. Thus, when the user creates a new icon, the created icon can be automatically assigned to a relevant icon room. Once an icon attribute is set in the detail setting menu 222, if a new icon having a relevant attribute is created, the created icon is automatically assigned to a relevant icon room. Thus, a user does not need to designate an icon room for every created icon room.

Figure 7:
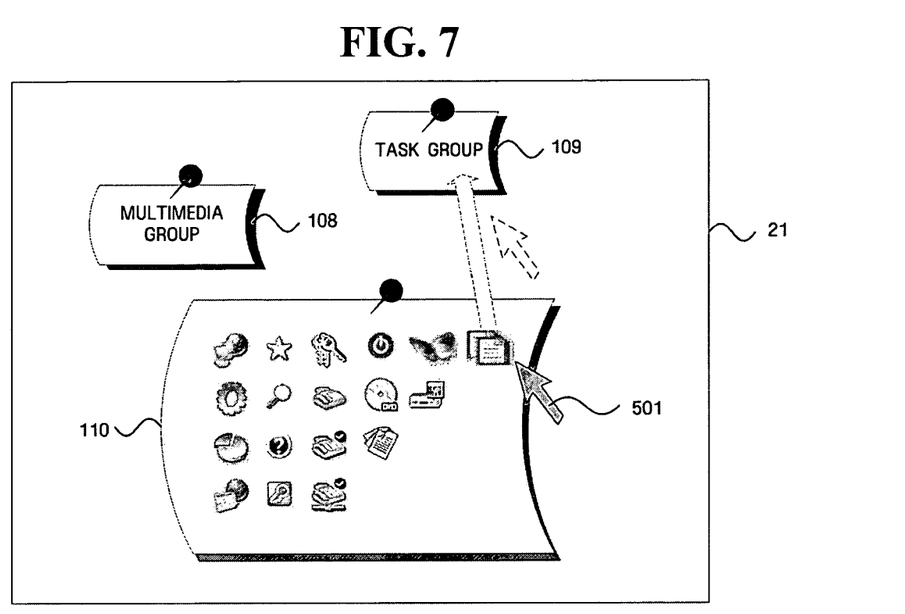
FIG. 7 illustrates icon rooms of a pin-up style according to an embodiment of the present invention.

FIG. 7 illustrates icon rooms of a pin-up style according to an embodiment of the present invention.

Three icon rooms are shown on a desktop background 21. The pin-up style icon room appears as a pinned-up piece of paper. A multimedia group icon room 108 and a task group icon room 109 are minimized and expressed using reduced skin images, and their names are indicated. Once a click or movement is input to the minimized icon room 108 or 109 through a pointing device such as a mouse, a tablet pen, or a touch screen, the minimized icon room 108 or 109 is activated like an activated icon room 110.

An icon can be moved between icon rooms. In FIG. 7, when an icon in an icon room 110 is selected using a mouse 501 and is dragged to the task group icon room 109, it is moved from the icon room 110 to the task group icon room 109. An icon may also be copied between icon rooms.

Although an icon name is not shown in FIG. 7, it may be shown if a system is set to do so. An icon name can be indicated by a text at all times or only when a mouse is moved over an image indicating a relevant icon.

Since the position of an icon room can be designated as desired by users, users can arrange icon rooms according to a specific criterion. For example, icon rooms can be arranged in order of the number of icons included in each of the icon rooms, the higher number preceding the lower, or in order of temporal precedence of the icon rooms, the earlier created icon room preceding the later created icon room. Icons in each icon room may also be arranged according to a specific criterion.

Figure 8:
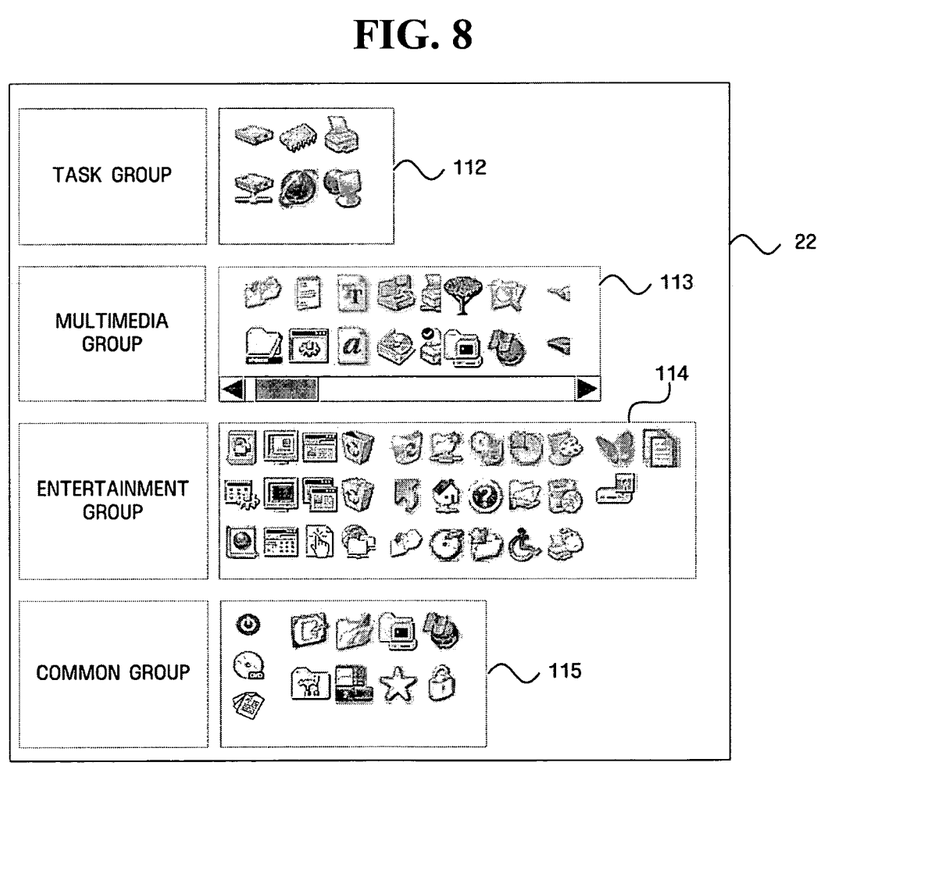
FIG. 8 illustrates icon rooms of a spread style according to an embodiment of the present invention.

FIG. 8 illustrates icon rooms of a spread style according to an embodiment of the present invention.

Four icon rooms are arranged on a desktop background 22. The spread style icon room appears as a spread-out roll of paper. The names of the four icon rooms 112 through 115 are indicated. When the number of icons included in an icon room exceeds the number of icons that can be shown within the icon room at a time, a scroll bar can be created as in the icon room 113.

Figure 9:
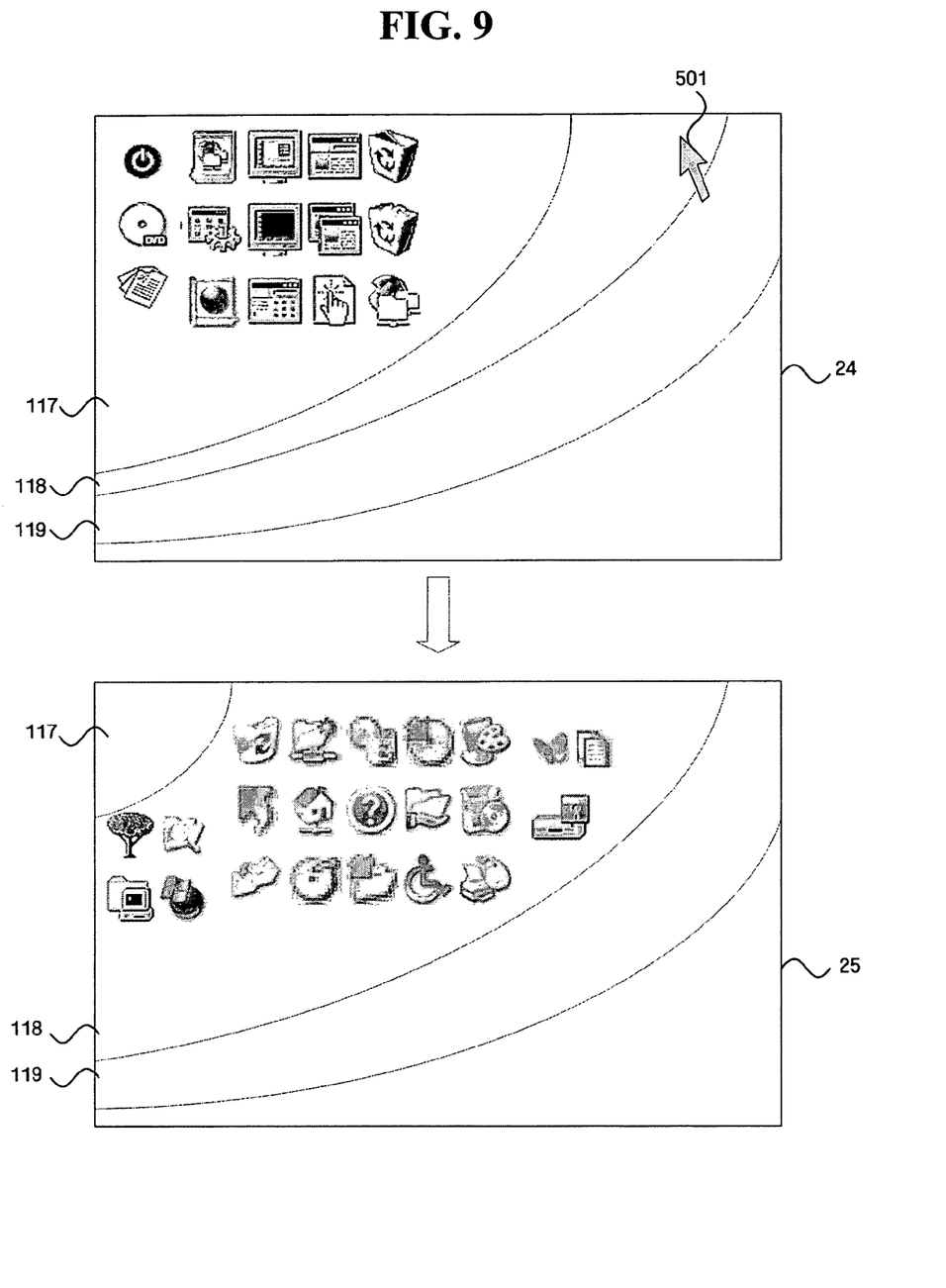
FIG. 9 illustrates icon rooms of a wave style according to an embodiment of the present invention.

FIG. 9 illustrates icon rooms of a wave style according to an embodiment of the present invention. Icon rooms 117 through 119 of a wave style are shown on a desktop background 24. When an icon room 118 is clicked on by a mouse pointer 501 or when the mouse pointer 501 is moved over the icon room 118, the desktop background 24 is changed to a desktop background 25. Thus, images of icons included in the icon room 118 appear and an icon room 117, which was activated in the desktop background 24, is minimized in the desktop background 25.

Figure 10:
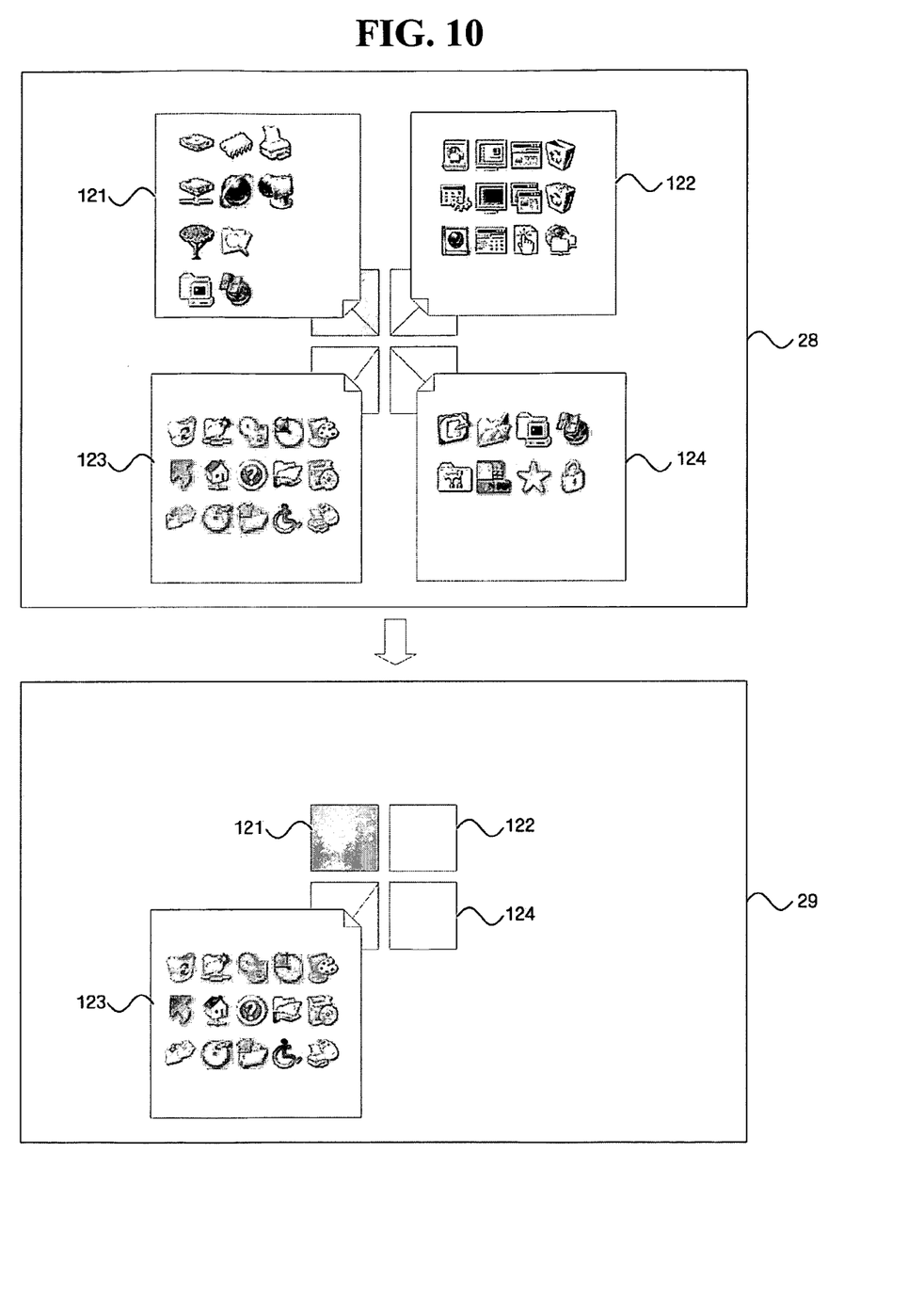
FIG. 10 illustrates icon rooms of a square style according to an embodiment of the present invention.

FIG. 10 illustrates icon rooms of a square style according to an embodiment of the present invention. Icon rooms 121 through 124 of a square style are shown on a desktop background 28. On the desktop background 28, all of the four icon rooms 121 through 124 are activated. On a desktop background 29, only the icon room 123 is activated and the other three icon rooms 121, 122, and 124 are minimized. The square style is an example of four icon rooms. If five icon rooms exist, their skin images may take a form of a pentagon.

The skin image styles and operations of the icon rooms described with reference to FIGS. 2 and 3 and FIGS. 7 through 10 are only examples and the present invention is not limited thereto.

Figure 11:
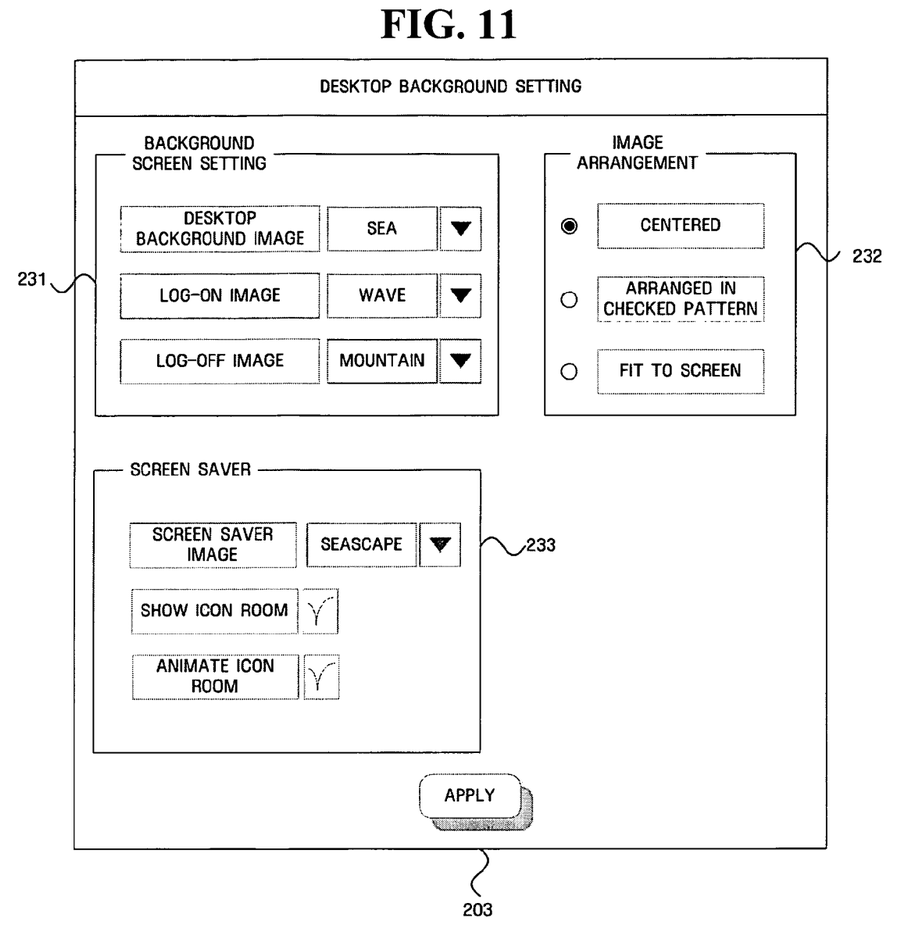
FIG. 11 illustrates a menu for setting a style of a desktop background according to an embodiment of the present invention.

FIG. 11 illustrates a menu for setting a style of a desktop background according to an embodiment of the present invention.

A style of a desktop background defines an image of a screen on which skin images of icon rooms are displayed. By setting the style of the desktop background, an image of a background screen on which skin images of icon rooms are displayed during a general computing operation and images of a screen during log-on/off processes can be selected. In addition, a screen saver function can be added.

A menu 203 allows a user to set a style of a desktop background. The menu 203 includes a background screen setting menu 231, an image arrangement menu 232, and a screen saver menu 233 as its sub menus.

The background screen setting menu 231 allows a user to set an output image. More specifically, an image of a background screen, an image of a screen during a log-on process, and an image of a screen during a log-off process can be set.

The image arrangement menu 232 allows a user to set the way in which an image is arranged on the screen. A "Centered" item indicates that an image is centered on a desktop background. An "Arranged in checked pattern" item indicates that an image is repetitively arranged in a checked pattern when the image is smaller than the size of the desktop background. A "Fit to screen" item indicates that an image is enlarged or reduced to fit to a screen without leaving a margin.

The screen saver menu 233 allows a user to set a screen saver function. A screen saver is a specific image which appears on a screen to protect a display device when there is no user input for a predetermined amount of time. A screen saver image to be output can be set and whether or not an icon room is shown can be set. If a "Show icon room" item is checked, a selection can be made whether to check an "Animate icon room" item that allows an icon room to freely move or be transformed as a single image on a desktop background. In addition, the wait time for the screen saver function and a password for the screen saver function can also be set.

Figure 12:
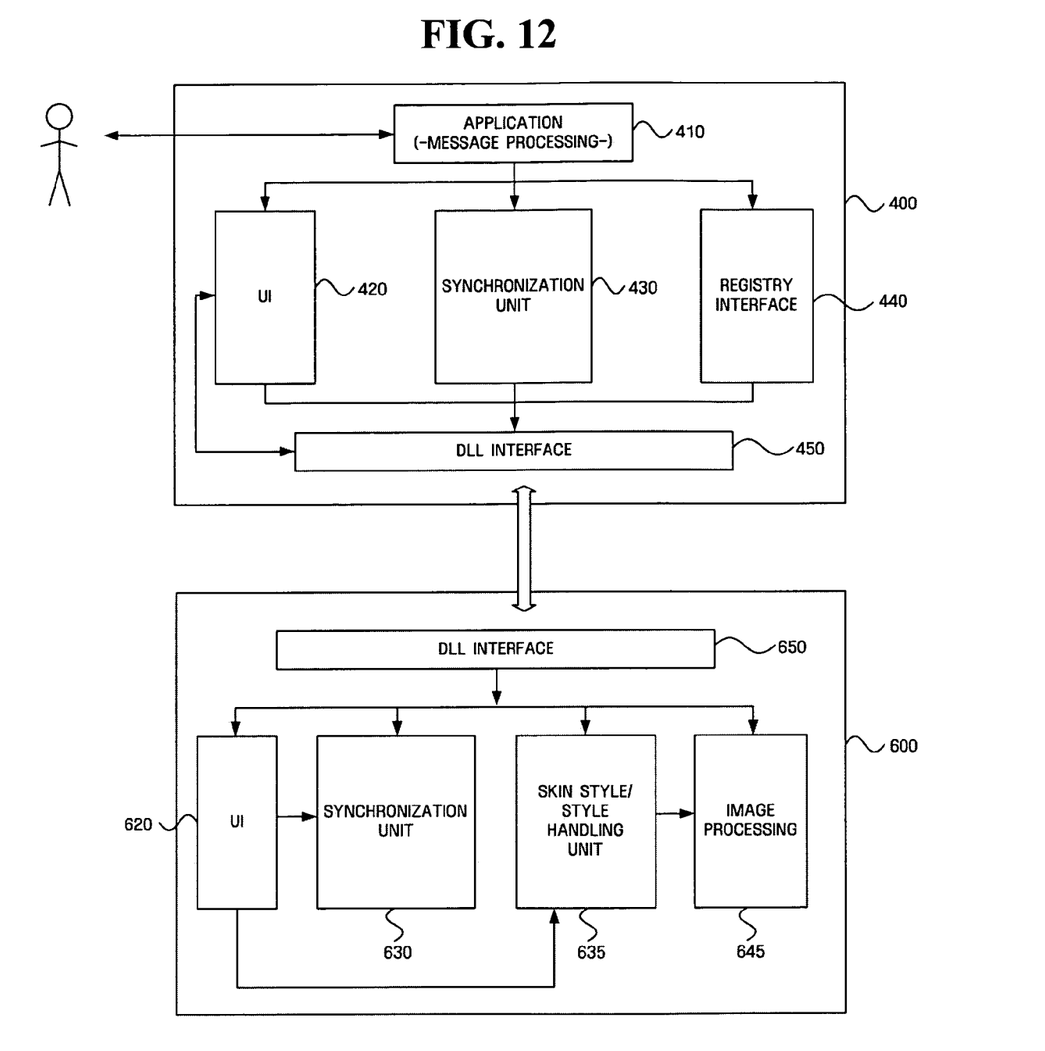
FIG. 12 illustrates configurations in a system, required for outputting an icon room according to an embodiment of the present invention and receiving an input signal, in terms of a user and the system.

FIG. 12 illustrates configurations in a system, which are required for outputting an icon room according to an embodiment of the present invention and receiving an input signal, in terms of a user and the system.

A system 400 is recognized by a user and a system 600 is a system for implementing the system 400. The user exchanges information with the system 400 using an output device and an input device. An application 410 provides information to and receives information from the user. According to an embodiment of the present invention, the user can exchange a message with the system 400. A message is a means of communication between an operating system and a user or an operating system and another system component. A user interface (UI) 420 provides a user interface to a user, outputs a skin image, and performs a function corresponding to a user input message such as movement or activation.

A synchronization unit 430 synchronizes creation, change, and deletion of icons managed in an icon room with information about the icons stored in the system 400. In a Linux or Unix system, synchronization can be performed by continuously modifying a user information file. In a system mounted in a personal digital assistant (PDA), synchronization can be performed by continuously modifying a relevant user information file or folder.

A registry interface 440 stores information set by a user, e.g., information about registration of or a change to an icon.

According to a user's operation, the user interface 420, the synchronization unit 430, the registry interface 440, and the application 410 perform their respective functions, which are implemented with the system 600.

For information exchange, a medium such as a DLL interface 450 or 650 is required. The DLL interface 450 or 650 exchange information with a file that is installed to implement an icon room, i.e., an execution file.

A user interface 620 and a synchronization unit 630 operate in the same manner as the user interface 420 and the synchronization unit 430 from the user's viewpoint of the system. For example, when the user moves an icon room, a skin image of the icon room is moved and output and an image of the icon room, which is output in the original position of the icon room, is removed. The synchronization unit 620 uses a virtual folder.

The virtual folder means a folder that refers to an actual folder existing in a user's storage device. In the case of a Windows system, if an icon room function is not initiated, icons are arranged on a general desktop background. After the icon room function is initiated, if a change is made to icons included in an icon room, synchronization is required. Thus, the icon room is matched to the virtual folder and the icons included in the icon room are referred to, thereby applying a change made in the icon room to the general desktop background.

A skin style/style handling unit 635 determines which skin image is to be used to show an icon room to a user and which color is to be used for a skin image, and displays an image processed by an image processing unit 645.

Figure 13:
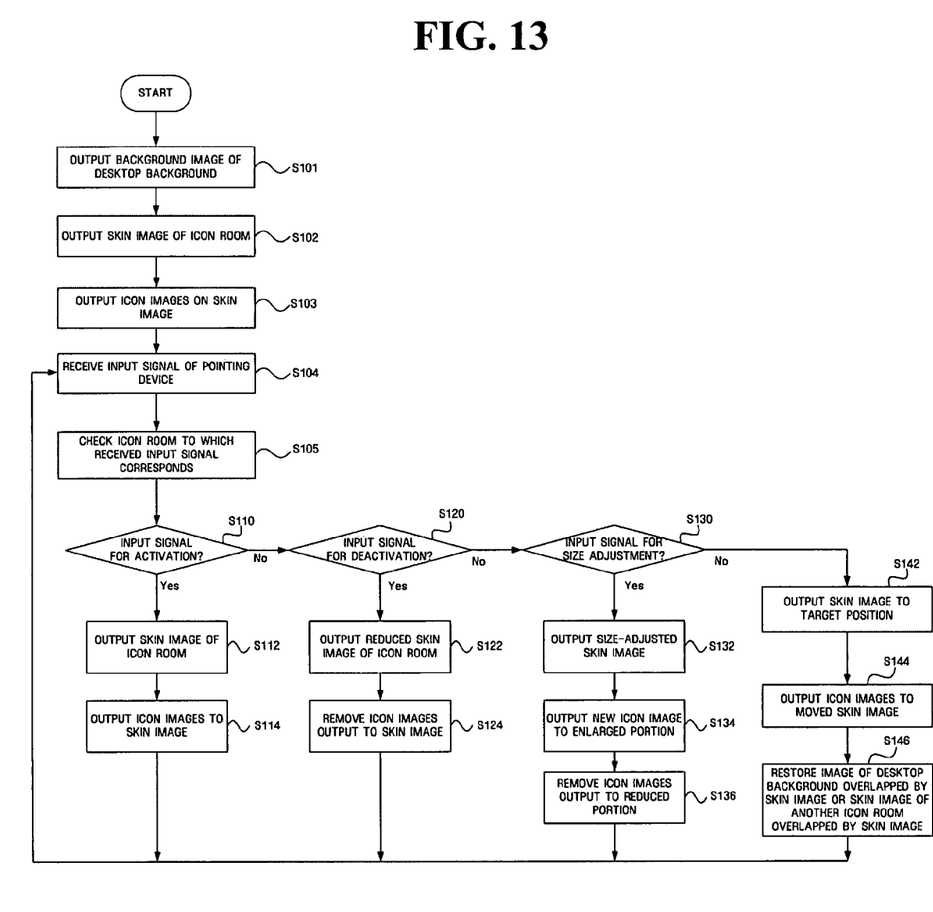
FIG. 13 is a flowchart illustrating a process of outputting an icon room according to an embodiment of the present invention.

FIG. 13 is a flowchart illustrating a process of outputting an icon room according to an embodiment of the present invention.

A system outputs a background image of a desktop background in step S101. The desktop background, which is set through a menu as shown in FIG. 11, may be output. A skin image of an icon room is output on the desktop background in step S102. The skin image style, the transparency, and the color of a line indicating a boundary of the skin image are set as explained with reference to FIGS. 5 and 6. Alternatively, the skin image may be set to default. When a plurality of icon rooms exists, skin images of all the icon rooms can be output. When an icon room is activated, icon images are output in step S103. When an icon room is minimized and output, images of icons included in the icon room are not output. When a user inputs a signal using a pointing device such as a mouse or a tablet pen, the input signal is received in step S104. An icon room to which the received input signal corresponds is checked in step S105. When at least two icon rooms overlap in a position where the input signal is received, the received input signal can be transmitted to a currently activated icon room. When deactivated or minimized icon rooms overlap, the received input signal can be transmitted to an icon room that is output topmost on a screen.

An icon room that receives the input signal performs a function requested by the input signal in steps S110, S120, and S130. When the input signal is for activation in step S110, a skin image of the icon room is output in step S112. Icon images included in the icon room are output to the skin image in step S114. When the input signal is for deactivation in step S120, a reduced skin image of the icon room is output in step S122. If the icon room is already activated, the skin image of the icon room is removed in step S124.

When the input signal is for size adjustment in step S130, the size-adjusted skin image is output in step S132. The skin image can be reduced or enlarged by size adjustment. In addition, a portion of the skin image can be enlarged and another portion of the skin image can be reduced. A new icon image is output to the enlarged portion in step S134. An already output icon image is removed from the reduced portion in step S136.

When the input signal is for movement, the skin image is output to a target position in step S142. Then, the icon images are output to the moved skin image in step S144. Since the skin image is moved, an image of a desktop background overlapped by the skin image can be restored or a skin image of another icon room overlapped by the skin image can be restored in step S146.

The input signal mentioned in FIG. 13 may be, for example, an electric signal generated in an input device or an input command generated in a digital device. This is because the electric signal generated in an input device can be transmitted in the form of a command through processing. The skin image and icon images may be output in the same way with that of the output device, i.e., according to whether an icon image is input to an output buffer before or after the output buffer is emptied out after the skin image is output to the output buffer.

According to the above-described embodiments of the present invention, usability can be improved by efficiently managing icons.

In addition, usability can be improved by arranging icons on a desktop background using a skin image.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A user interface to be displayed on a monitor for managing icons on a group-by-group basis using a skin image, the user interface comprising:
   an icon room which selectively provides one of a stored skin image and a reduction of the skin image, as a reduced skin image, on a desktop background depending on a determination of whether the icon room is activated; and
   a plurality of icon images which are included in the icon room and are provided on the skin image on the desktop background when the determination indicates that the icon room is activated, with the reduced skin image being provided on the desktop background instead of the skin image when the determination indicates that the icon room is not activated,
   wherein the icon images included in the icon room and objects linked to each of the icon images have at least one common attribute, and
   wherein there are a plurality of icon rooms, with respective skin images, and the icon images on the desktop background are automatically included in a relevant icon room according to attributes that are set for the icon rooms.

2. The user interface of claim 1, wherein the reduced skin image is extracted from the same image file as that of the skin image.

3. The user interface of claim 1, wherein when a signal for adjusting the size of the icon room is received, the size of the skin image or the reduced skin image is adjusted and the number of provided icon images is changed according to the adjusted size of the skin image or the reduced skin image.

4. The user interface of claim 1, wherein when a signal for moving the position of the icon room is received, the provided skin image or reduced skin image is moved and the plurality of icon images included in the icon room is provided over the moved skin image.

5. The user interface of claim 1, wherein when the focus of a pointing device is lost from the skin image, the icon room is deactivated.

6. The user interface of claim 5, wherein when the icon room is deactivated, the icon room provides the reduced skin image and a portion of the icon images included in the icon room is removed.

7. The user interface of claim 1, wherein there are a plurality of icon rooms, and when icon images provided by the plurality of icon rooms overlap, a skin image of an activated icon room is provided in an overlapping area.

8. The user interface of claim 1, wherein the common attribute includes at least one of an execution program, multimedia content, and a document.

9. The user interface of claim 1, wherein the plurality of icon rooms are arranged on the desktop background according to a user-set criterion.

10. A method for managing icons on a group-by-group basis using a skin image, the method comprising:
    selectively providing one of a stored skin image and a reduction of the skin image, as a reduced skin image, of an icon room on a desktop background according to a determination of whether the icon room is activated;
    receiving an input signal activating the icon room; and
    providing a plurality of icon images included in the icon room on the provided skin image on the desktop background when the icon room is activated and providing the reduced skin image, without providing the plurality of icon images, on the desktop background when the determination indicates that the icon room is not activated, wherein the icon images included in the icon room and objects linked to each of the icon images have at least one common attribute, and wherein there exists a plurality of icon rooms, with respective skin images, and the icon images on the desktop background are automatically included in a relevant icon room according to attributes that are set for the icon rooms.

11. The method of claim 10, wherein the reduced skin image is extracted from the same image file as that of the skin image.

12. The method of claim 10, further comprising:
receiving an input signal adjusting the size of the icon room;
adjusting the size of the skin image of the icon room; and
changing the number of the plurality of icon images according to the adjusted size of the skin image.

13. The method of claim 10, further comprising:
receiving an input signal for moving the position of the icon room;
providing a moved skin image of the icon room; and
providing a plurality of icon images included in the icon room on the moved skin image.

14. The method of claim 10, wherein, when the focus of a pointing device is lost from the skin image, the icon room is deactivated.

15. The method of claim 10, further comprising:
receiving an input signal deactivating the icon room;
providing a reduced skin image of the icon room; and
removing the icon images provided on the skin image of the icon room.

16. The method of claim 10, wherein there are a plurality of icon rooms, and when icon images provided by the plurality of icon rooms overlap, a skin image of an activated icon room is provided in an overlapping area.

17. The method of claim 10, wherein the common attribute includes at least one of an execution program, multimedia content, and a document.

18. The method of claim 10, wherein the plurality of icon rooms is arranged on the desktop background according to a user-set criterion.

19. A user interface to be displayed on a monitor, the user interface comprising:
an icon room selectively providing one of a skin image and a reduced version of the skin image on a desktop background depending on whether the icon room is activated;
at least one icon image disposed in the icon room and provided on the skin image when the icon room is activated, and
wherein the reduced version of the skin image is provided on the desktop background instead of the skin image when the icon room is not activated.

20. A method of managing icons, the method comprising:
providing one of a skin image and a reduced version of the skin image on a desktop background based on whether an icon room is activated;
disposing at least one icon image in the icon room, and providing the at least one icon image on the skin image when the icon room is activated; and
providing the reduced version of the skin image on the desktop background instead of the skin image when the icon room is not activated.

* * * * *

UNITED STATES PATENT AND TRADEMARK OFFICE
CERTIFICATE OF CORRECTION

| | |
|---|---|
| PATENT NO. | : 7,603,628 B2 |
| APPLICATION NO. | : 11/281592 |
| DATED | : October 13, 2009 |
| INVENTOR(S) | : Park et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this

Fourteenth Day of December, 2010

David J. Kappos
*Director of the United States Patent and Trademark Office*